(12) United States Patent
Dudhwala et al.

(10) Patent No.: US 6,728,085 B2
(45) Date of Patent: Apr. 27, 2004

(54) CIRCUIT BREAKER WITH SHUNT

(75) Inventors: Tejal Navin Dudhwala, Coraopolis, PA (US); Jeffrey Scott Gibson, Aliquippa, PA (US)

(73) Assignee: Eaton Corporation, Cleveland, OH (US)

( * ) Notice: Subject to any disclaimer, the term of this patent is extended or adjusted under 35 U.S.C. 154(b) by 318 days.

(21) Appl. No.: 09/862,157

(22) Filed: May 21, 2001

(65) Prior Publication Data

US 2002/0171987 A1 Nov. 21, 2002

(51) Int. Cl.$^7$ .................................................. H02H 9/08
(52) U.S. Cl. ............................................ 361/42; 361/42
(58) Field of Search ............................... 361/42, 45, 43, 361/46, 102, 103

(56) References Cited

U.S. PATENT DOCUMENTS

| | | |
|---|---|---|
| 4,949,214 A | 8/1990 | Spencer |
| 5,224,006 A | 6/1993 | MacKenzie et al. |
| 5,293,142 A | 3/1994 | Fello et al. |
| 5,420,740 A | 5/1995 | MacKenzie et al. |
| 5,519,561 A | 5/1996 | Mrenna et al. |
| 5,691,869 A | 11/1997 | Engel et al. |
| 5,831,509 A | 11/1998 | Elms et al. |
| 5,982,593 A * | 11/1999 | Kimblin et al. ............. 361/42 |
| 6,014,297 A * | 1/2000 | Clarey et al. ............... 361/42 |
| 6,191,589 B1 * | 2/2001 | Clunn ......................... 324/424 |
| 6,392,513 B1 * | 5/2002 | Whipple et al. ............. 335/18 |
| 6,477,022 B1 * | 11/2002 | Ennis et al. ................. 361/42 |

* cited by examiner

Primary Examiner—Brian Sircus
Assistant Examiner—Danny Nguyen
(74) Attorney, Agent, or Firm—Martin J. Moran

(57) ABSTRACT

A circuit breaker that is capable of detecting ground faults as well as arc faults includes a at least a first current transformer, a line conductor extending through the current transformers, a circuit board, and a pair of sensing leads extending between the line conductor and the circuit board. In a first embodiment the line conductor is a relatively rigid line bus bar, and in a second embodiment the line conductor is a relatively flexible line shunt. The circuit board is disposed adjacent a first side of a separating wall within the circuit breaker, and the line conductor extends along the first side such that the sensing leads that extend between the line conductor and the circuit board do not pass through a plane defined by the separating wall. The circuit breaker includes a bimetal strip that is free of sensing leads that extend between the bimetal strip and the circuit board.

20 Claims, 2 Drawing Sheets

CIRCUIT BREAKER WITH SHUNT

BACKGROUND OF THE INVENTION

1. Field of the Invention

The present invention relates generally to circuit breakers and, more particularly, to a circuit breaker having a bus bar extending through at least a first current transformer, in which a shunt extends from the bus bar.

2. Description of the Related Art

Numerous types of circuit breakers are known and understood in the relevant art. Among the purposes for which circuit breakers are provided is to interrupt current on demand or under certain defined circumstances.

One type of circuit breaker that is typically used in relatively lower-current domestic applications is known as a "miniature" circuit breaker. Such miniature circuit breakers often are single pole breakers and are configured to be installed in a cabinet that houses a plurality of such miniature circuit breakers.

In their most simple form, miniature circuit breakers include a line terminal that is connectable with a power source and a load terminal that is connectable with an electrical load. Such a miniature circuit breaker typically includes a thermal trip mechanism in the form of a bimetal strip that triggers an operating mechanism to separate a pair of separable electrical contacts to interrupt the flow of current therethrough during an overcurrent condition of a sustained duration. Such circuit breakers typically additionally include a magnetic trip mechanism that triggers the operating mechanism in the event of a sudden increase in the current flowing through the circuit breaker.

A relatively more advanced miniature circuit breaker additionally includes a ground fault detection system that is operatively connected with the operating mechanism to open the contacts in the event of a line-to-ground fault or a neutral-to-ground fault. Such circuit breakers typically are referred to as ground fault circuit breakers.

The ground fault detection system of the ground fault circuit breaker typically includes a pair of spaced current transformers and a circuit board. The primaries of the current transformers are conductors that pass the current traveling through the circuit breaker through the central bores of the toroidal current transformers forming the secondary windings. The secondary windings of the current transformers are connected with the circuit board. As is set forth in U.S. Pat. No. 5,293,142 to Fello et al., the circuit breaker can include relatively rigid bus bars that are connected with the conductors and extend between the current transformers.

Such ground fault circuit breakers include a line terminal connectable with a power source, a load terminal connectable with an electrical load, a neutral terminal for connecting the electrical load with a neutral conductor of the circuit breaker, and a pigtail extending from the neutral conductor of the circuit breaker and connected to the distribution system neutral conductor.

A still more sophisticated type of ground fault circuit breaker can additionally detect the existence of an arc fault between a wire connected with the line terminal and a wire connected with the neutral terminal. Such circuit breakers are typically known as arc fault circuit breakers, one of which is described generally in U.S. Pat. No. 5,224,006, and a preferred one of which is described generally in U.S. Pat. No. 5,691,869.

Such arc fault circuit breakers typically sense the current traveling through the circuit breaker and analyze a waveform derived therefrom to detect an arc fault. In previously known circuit breakers, the current was sensed by connecting a pair of sensing leads to opposite ends of the bimetal strip and detecting the voltage drop along the bimetal strip between the leads to sense current.

While such arc fault circuit breakers have been generally effective at achieving their intended goals, such arc fault circuit breakers have not, however, been without limitation. For instance, in circumstances where the voltage drop along the bimetal strip is measured in order to sense current flowing through circuit breaker, the leads that are connected with the bimetal strip are attached thereto by welding. Such welding has a deleterious effect on the sensitive material of the bimetal strip. Additionally, leads that are attached to the bimetal strip have a tendency to resist the natural flexing motion of the bimetal strip in response to a prolonged overcurrent condition and thus interfere with the desirable current interruption features of the circuit breaker. While it has been known to provide an additional conductor extending from the free end of the bimetal strip toward the fixed end thereof in order to avoid having to connect a lead directly to the free end of the bimetal strip, such a methodology still does not avoid the need to weld at least one lead onto the bimetal strip.

Another shortcoming of such known arc fault circuit breakers involves a separating wall disposed within the circuit breaker. Such a separating wall is advantageously provided both for structural reasons as well as to separate the mechanical components of the circuit breaker from the circuit board. Such separation is desirable in order to resist contamination of the circuit with vaporized metal and carbon that results during interruption of the circuit. In known circuit breakers in which leads are connected directly with the bimetal strip, the leads must be passed through a passageway in the separating wall for connection with the circuit board. Such extension of the leads through the separating wall increases the complexity and cost of the circuit breaker, both in terms of materials and labor.

It is thus desired to provide an improved arc fault circuit breaker in which sensing leads are not welded to a bimetal strip and do not pass through the separating wall of the circuit breaker. Such a circuit breaker preferably will be configured such that the sensing leads are connected with another conductive component on the same side of the separating wall as the circuit board.

SUMMARY OF THE INVENTION

In view of the foregoing, a circuit breaker that is capable of detecting ground faults as well as arc faults includes a at least a first current transformer, a line conductor extending through the current transformers, a circuit board, and a pair of sensing leads extending between the line conductor and the circuit board. In a first embodiment the line conductor is a relatively rigid line bus bar, and in a second embodiment the line conductor is a relatively flexible line shunt. The circuit board is disposed adjacent a first side of a separating wall within the circuit breaker, and the line conductor extends along the first side such that the sensing leads that extend between the line conductor and the circuit board do not pass through a plane defined by the separating wall. The circuit breaker includes a bimetal strip that is free of sensing leads that extend between the bimetal strip and the circuit board.

An aspect of the present invention is to provide a circuit breaker that is free of sensing leads welded to a bimetal strip thereof.

Another aspect of the present invention is to provide a circuit breaker having a pair of current transformers and a line conductor extending between the current transformers, in which a pair of sensing leads are connected at spaced locations with the line bus bar and extend to a circuit board within the circuit breaker.

Another aspect of the present invention is to provide a circuit breaker having a separating wall that separates a plurality of mechanical components of the circuit breaker from a circuit board of the circuit breaker, in which sensing leads that are connected with the circuit board do not pass through a plane defined by the separating wall.

Another aspect of the present invention is to provide a circuit breaker having an arc fault detection capability in which sensing leads extend between a circuit board and a substantially rigid line bus bar.

Another aspect of the present invention is to provide a circuit breaker having an are fault detection capability in which sensing leads extend between a circuit board and a relatively flexible line shunt.

Another aspect of the present invention is to provide a circuit breaker having an arc fault detection capability in which sensing leads do not interfere with the natural bending of a bimetal strip in response to a prolonged overcurrent condition.

Another aspect of the present invention is to provide a circuit breaker having an arc fault detection capability and a bimetal strip, in which the bimetal strip is free of sensing leads welded thereto.

Another aspect of the present invention is to provide a circuit breaker, the general nature of which can be stated as including a set of electrical contacts disconnectably engaged with one another, an operating mechanism structured to responsively disconnect the electrical contacts from one another, a sensor apparatus including a pair of sensing leads, at least a first current transformer, and a sensor, and a line conductor conductively connected with one of the electrical contacts and extending through the at least first current transformer, the sensing leads being electrically connected with the line conductor at spaced apart locations, each sensing lead extending between the line conductor and the sensor, and the sensor being operatively connected with the operating mechanism, the sensor being structured to measure the voltage drop along the line conductor between the pair of sensing leads.

Another aspect of the present invention is to provide a circuit breaker, the general nature of which can be stated as including a set of electrical contacts disconnectably engaged with one another, an operating mechanism structured to responsively disconnect the electrical contacts from one another, a sensor apparatus including a pair of sensing leads, at least a first current transformer, and a sensor, a line conductor conductively connected with one of the electrical contacts and extending through the at least first current transformer, and a neutral bus bar extending through the at least first current transformer and being spaced from the line conductor, the sensing leads being electrically connected at spaced apart locations with one of the line conductor and the neutral bus bar, each sensing lead extending between the sensor and the one of the line conductor and the neutral conductor, and the sensor being operatively connected with the operating mechanism, the sensor being structured to measure the voltage drop along the one of the line conductor and the neutral conductor between the pair of sensing leads.

BRIEF DESCRIPTION OF THE DRAWINGS

A further understanding of the invention can be gained from the following description of the preferred embodiment when read in conjunction with accompanying drawings in which.

DESCRIPTION OF THE PREFERRED EMBODIMENT

Figure 1:
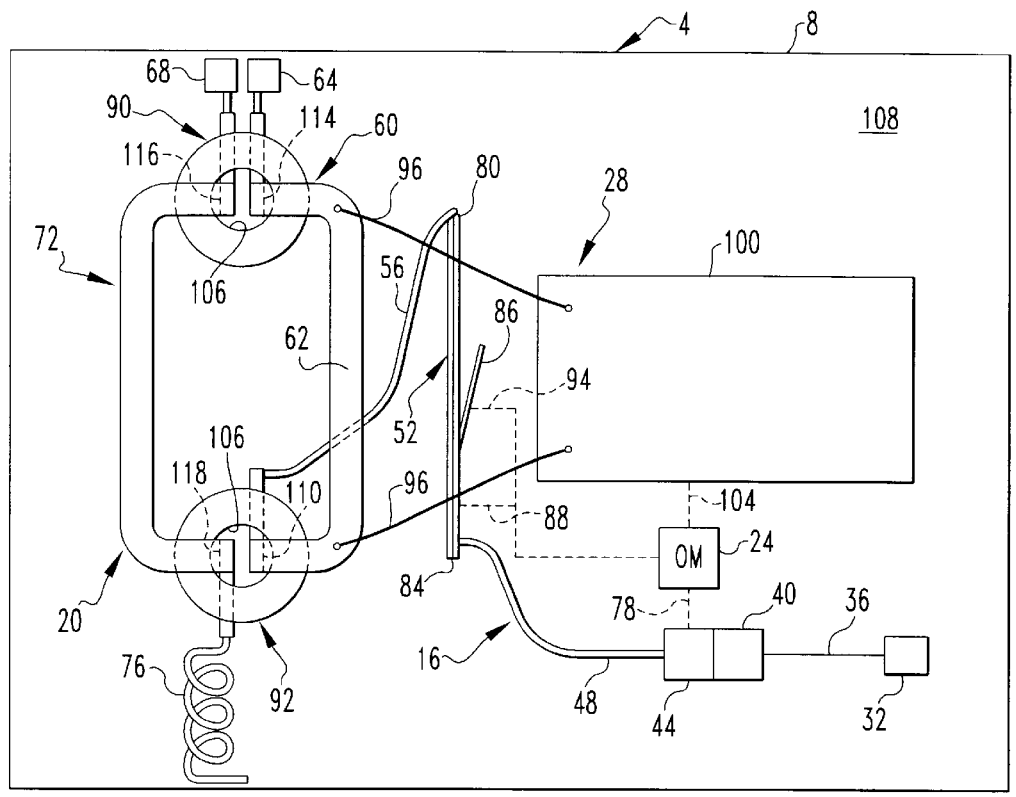
FIG. 1 is a schematic front elevational view of a circuit breaker in accordance with a first embodiment of the present invention.
Figure 2:
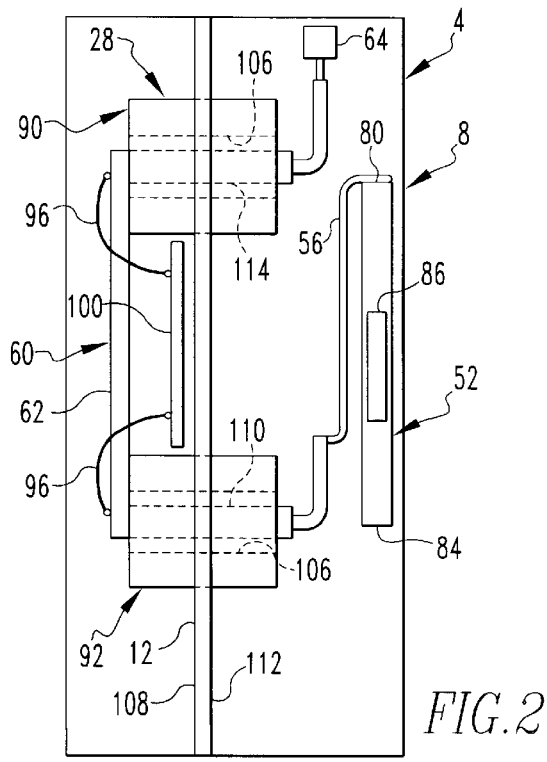
FIG. 2 is a schematic side elevational view of the circuit breaker.

A circuit breaker 4 in accordance with the present invention is indicated generally in FIGS. 1 and 2. The circuit breaker 4 includes a case 8 having a separating wall 12, with the case 8 carrying a line current path 16, a neutral current path 20, an operating mechanism 24, and a sensor apparatus 28. As will be set forth more fully below, the circuit breaker 4 is configured to interrupt the flow of current along the line current path 16 during specified overcurrent conditions and during certain fault conditions.

The fault conditions include ground faults as well as arcing faults. As will be set forth more fully below, the sensor apparatus 28 is configured to identify the existence of any such fault condition and is responsively cooperable with the operating mechanism 24 to interrupt current traveling through the line current path 16 in the event of such a fault condition.

As can be seen in FIG. 1, the line current path 16 is an interruptible path along which current travels through the circuit breaker 4 between a power source (not shown) and an electrical load (not shown). The line current path 16 includes a line terminal 32 that is connectable with the power source. A first conductor 36 extends between the line terminal 32 and a stationary contact 40 that is removably engaged with a movable contact 44. As will be set forth more fully below, the movable contact 44 is movable away from the stationary contact 40 to interrupt current flowing through the line current path 16.

A flexible second conductor 48 extends from the movable contact 44 to a bimetal strip 52. As will be set forth more fully below, the bimetal strip 52 is configured in a known fashion to bend or deflect in response to a sustained overcurrent condition to trigger the operating mechanism 24 and interrupt the flow of current through the line current path 16.

A third conductor 56 extends between the bimetal strip 52 and a line bus bar 60. The line bus bar 60 operates as a line conductor 62 that is electrically connected with the movable contact 44. As will be set forth more fully below, the line conductor 62 can be of configurations other than the line bus bar 60 without departing from the concept of the present invention.

The line bus bar 60 connects with a line terminal 64 that is at the opposite end of the line current path 16 from the line terminal 32. The line terminal 64 is connectable with a wire that extends to the line side of the electrical load.

The neutral current path 20 includes a neutral terminal 68 connected with neutral bus bar 72 that is, in turn, connected with a pigtail 76. The neutral terminal 68 is connectable with a wire that extends to the neutral side of the electrical load. The pigtail 76 is connectable with the neutral conductor of a power source.

The operating mechanism 24 is operatively connected with the movable contact 44 as is indicated by the first dashed line 78. During certain specified overcurrent and fault conditions, as will be set forth more fully below, the operating mechanism 24 is operable to disengage the movable contact 44 from the stationary contact 40 to interrupt current flowing through the line current path 16.

The bimetal strip 52 includes a fixed end 80 and a free end 84 opposite one another. The fixed end 80 is substantially immovable. The second conductor 48 is connected with the free end 84 of the bimetal strip 52, and the third conductor 56 is connected with the fixed end 80 thereof, with both the second and third conductors 48 and 56 being affixed by soldering, welding, mechanical attachment, or other appropriate connection methodology. In response to a prolonged overcurrent condition, heat from electrical resistance within the bimetal strip 52 causes the bimetal strip 52, and particularly the free end 84 thereof, to bend or deflect from the position depicted generally in FIG. 1 to trigger the operating mechanism 24 (as indicated by a second dashed line 88) to interrupt current flowing through the line current path 16.

The bimetal strip 52 additionally includes a magnetic trip 86 between the fixed and free ends 80 and 84 that is operatively connected with the operating mechanism 24 as is indicated by the third dashed line 94. The magnetic trip 86, as is known in the relevant art, reacts quickly to sudden increases in current flowing through the bimetal strip 52 and triggers the operating mechanism 24 to disengage the movable contact 44 from the stationary contact 40 if the increase in current is of sufficient magnitude. It thus can be seen that the flow of current through the line current path 16 will be interrupted in a known fashion by the bimetal strip 52 in the event of an overcurrent condition of sufficient duration or by the magnetic trip 86 in the event of an overcurrent condition of sufficient magnitude.

The sensor apparatus 28 includes a first current transformer 90, a second current transformer 92, a circuit board 100, and a pair of sensing leads 96 that extend between the line bus bar 60 and the circuit board 100. It is understood, however, that in other embodiments of the circuit breaker 4, the sensor apparatus may not include the second current transformer 92. For reasons that will be set forth more fully below, the circuit board 100 is operatively connected with the operating mechanism 24 as is depicted by a fourth dashed line 104.

The first and second current transformers 90 and 92 are generally toroidal in shape and include a plurality of windings that form the secondary windings thereof. The winding of the first and second current transformers 90 and 92 are electrically connected with the circuit board 100, although this is not specifically depicted in FIG. 1.

The line and neutral bus bars 60 and 72 each extend between the first and second current transformers 90 and 92. The line and neutral bus bars 60 and 72 are substantially rigid conductive members that are generally U-shaped and are spaced from one another. The line and neutral bus bars 60 and 72 additionally include substantially rigid extension conductors 110, 114, 116, and 118 that extend through the central bores 106 in the first and second current transformers 90 and 92 but form the primaries of the first and second current transformers 90 and 92.

The circuit board 100 is configured to detect a line-to-ground fault or a neutral-to-ground fault by analyzing the signals generated by the windings of the first and second current transformers 90 and 92 in a known fashion. The circuit board 100 additionally analyzes a waveform generated by the current traveling through the line current path 16 to detect the presence of arc faults.

More specifically, the sensing leads 96 are electrically conductively connected with the line bus bar 60 at spaced locations. The resistance of the line bus bar 60 between the pair of sensing leads 96 is known (or is readily ascertainable), such that by detecting the voltage drop along the line bus bar 60 between the pair of sensing leads 96, the current flowing through the line bus bar 60 and thus through the line current path 16 can be determined.

By connecting the sensing leads 96 to the relatively rigid and substantially immovable line bus bar 60, the sensing leads 96 are not subject to flexing on a regular basis, thus substantially reducing the likelihood that the sensing leads 96 may break or otherwise fail. Moreover, by connecting the sensing leads 96 to the line bus bar 60 instead of to the bimetal strip 52, the sensitive bimetal strip 52 does not need to endure the harsh welding process whereby the sensing leads 96 would otherwise be connected therewith. Additionally, the sensing leads 96 do not interfere with the flexing or deflection function of the bimetal strip 52 in response to a prolonged overcurrent condition.

As can be seen in FIG. 2, the circuit board 100 is disposed adjacent a first side 108 of the separating wall 12, and the mechanical portions of the circuit breaker 4, particularly the bimetal strip 52, the stationary contact 40, and the movable contact 44, are disposed adjacent a second side 112 of the separating wall 12. It can further be seen from FIG. 2 that the sensing leads 96 extend directly between the line bus bar 60 and the circuit board 100 without passing through any plane defined by the separating wall 12. By avoiding the need to route the sensing leads 96 from the mechanical side of the circuit breaker 8 (adjacent the second side 112) through the separating wall 12 to the non-mechanical side (adjacent the first side 108) of the circuit breaker 4, the complexity of the circuit breaker 4 is reduced and the reliability thereof is correspondingly increased. A reduction in the complexity of the circuit breaker 4 results in a corresponding reduction in the cost of manufacturing the circuit breaker 4, both in terms of labor and materials. Moreover, the cross-sectional size of the line bus bar 60 is substantially greater than that of the bimetal strip 52, whereby the line bus bar 60 will experience relatively smaller temperature fluctuations, with resulting increased accuracy in the measurement of current flowing through the line current path 16 and less potential for thermal damage to the circuit board 100.

While the sensing leads 96 are depicted in FIG. 1 as traveling essentially directly between the line bus bar 60 and the circuit board 100, it is understood that the sensing leads 96 likely will be twisted with one another along a substantial portion of their lengths. Moreover, while the sensing leads 96 are depicted as being connected substantially at opposite ends of the longest linear portion of the line bus bar 60, it is understood that the sensing leads 96 may be connected at substantially any spaced locations on the line bus bar 60.

The circuit breaker 4 of the present invention thus achieves substantial advantages in simplicity, reliability, cost, and repeatability by configuring the sensing leads 96 to be connected with and extend from the line bus bar 60 instead of from the bimetal strip 52. The improved functionality of the circuit breaker 4, combined with the reduced stresses experienced by the bimetal strip 52, provide advantages heretofore unknown in the relevant art.

Figure 3:
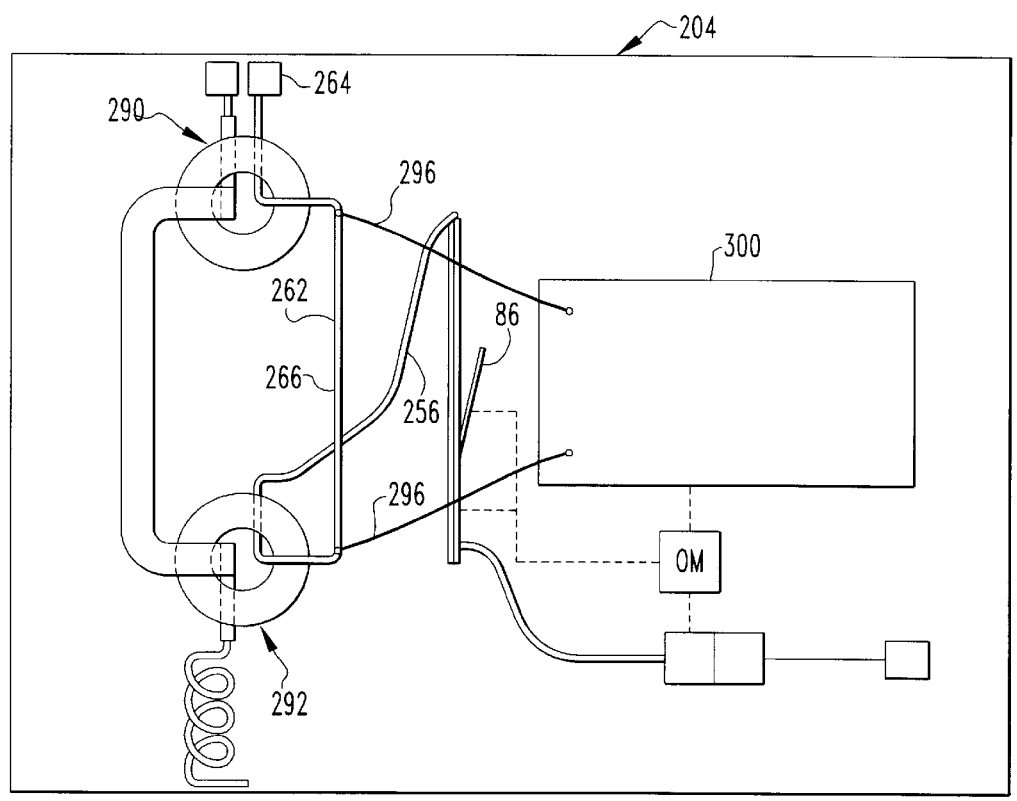
FIG. 3 is a schematic front elevational view of a circuit breaker in accordance with a second embodiment of the present invention Similar numerals refer to similar parts throughout the specification.

A second embodiment of a circuit breaker 204 in accordance with the present invention is indicated generally in FIG. 3. The circuit breaker 204 is similar to the circuit breaker 4, except that it includes a line conductor 262 that is in the form of a line shunt 266. The line shunt 266 is a relatively flexible metal member made of braided or woven metal fibers that conduct current therethrough yet remain relatively flexible. The line shunt 266 extends between the first and second current transformers 290 and 292 and terminates at the line terminal 264. The line shunt 266 and the third conductor 256 may be formed as a single continuous member without departing from the concept of the present invention.

As can be seen in FIG. 3, the sensing leads 296 are connected with the line shunt 266 at spaced apart locations and extend therefrom to the circuit board 300 in a fashion similar to the configuration of the circuit breaker 4. The line shunt 266, due to its flexible nature, may additionally include an insulative coating on the outer surface thereof to resist shorting with other components within the circuit breaker 204.

The line shunt 266 may be made of many different conductive materials in various combinations, and in one exemplar embodiment may be made of a combination of copper and nickel. Such a copper/nickel combination has a relatively higher resistance than copper alone such that the voltage drop along the line shunt 266 between the sensing leads 296 can be more easily ascertained than if the line shunt 266 were made solely of copper which would have a relatively lower resistance. By configuring the line shunt 266 to have a slightly resistive character, meaning that it has an electrical resistance at least nominally greater than that of copper alone, the circuit board 300 can readily ascertain the voltage drop between the sensing leads 296 and thus can determine the current flowing through the line shunt 266. The circuit board 300 accordingly can detect the existence of various fault conditions.

The circuit breaker 204 thus is of a slightly different configuration than the circuit breaker 4, yet provides other substantial benefits heretofore unknown in the relevant art. The flexible nature of the line shunt 266 makes the circuit breaker 204 relatively easier to manufacture than previously known circuit breakers, and the line shunt 266 can be manufactured to have a slightly resistive character to facilitate determination of the current flowing therethrough.

While particular embodiments of the present invention have been described herein, it is understood with various changes, additions, modifications, and adaptations may be made without departing from the scope of the present invention, as set forth in the following claims.

What is claimed is:

1. A circuit breaker comprising:

a set of electrical contacts disconnectably engaged with one another;

an operating mechanism structured to responsively disconnect the electrical contacts from one another;

a sensor apparatus including a pair of sensing leads, at least a first current transformer, and a sensor; and a line conductor conductively connected with one of the electrical contacts and extending through the at least first current transformer;

the sensing leads being electrically connected with the line conductor at spaced apart locations, each sensing lead extending between the line conductor and the sensor; and the sensor being operatively connected with the operating mechanism, the sensor being structured to measure the voltage drop along the line conductor between the pair of sensing leads.

2. The circuit breaker as set forth in claim 1, in which the sensor apparatus includes a second current transformer, the line conductor extending between the at least first and second current transformers.

3. The circuit breaker as set forth in claim 2, in which the at least first and second current transformers are each formed with a central bore, the line conductor extending through the central bores of the at least first and second current transformers.

4. The circuit breaker as set forth in claim 2, further comprising a neutral bus bar extending between the at least first and second current transformers and being spaced from the line conductor.

5. The circuit breaker as set forth in claim 4, in which the line conductor is a line bus bar.

6. The circuit breaker as set forth in claim 5, in which the line bus bar is substantially rigid.

7. The circuit breaker as set forth in claim 4, in which the line conductor is a line shunt.

8. The circuit breaker as set forth in claim 7, in which the line shunt has a higher electrical resistance than that of copper.

9. The circuit breaker as set forth in claim 1, in which the circuit includes a bimetal strip having a fixed end and a free end, the bimetal strip being structured to conduct current between the fixed and free ends, the bimetal member being free of connections with the sensing leads of the sensor apparatus.

10. The circuit breaker as set forth in claim 1, in which the circuit breaker includes a case having a separating wall, and in which the sensor includes a circuit board disposed adjacent a first side of the separating wall, the sensing leads extending between the line conductor and the circuit board substantially without passing through a plane defined by the separating wall.

11. A circuit breaker comprising:

a set of electrical contacts disconnectably engaged with one another;

an operating mechanism structured to responsively disconnect the electrical contacts from one another;

a sensor apparatus including a pair of sensing leads, at least a first current transformer, and a sensor;

a line conductor conductively connected with one of the electrical contacts and extending through the at least first current transformer; and a neutral bus bar extending through the at least first current transformer and being spaced from the line conductor;

the sensing leads being electrically connected at spaced apart locations with one of the line conductor and the neutral bus bar, each sensing lead extending between the sensor and the one of the line conductor and the neutral conductor; and the sensor being operatively connected with the operating mechanism, the sensor being structured to measure the voltage drop along the one of the line conductor and the neutral conductor between the pair of sensing leads.

12. The circuit breaker as set forth in claim 11, in which the sensor apparatus includes a second current transformer, the line conductor and the neutral bus bar extending between the at least first and second current transformers.

13. The circuit breaker as set forth in claim 12, in which the at least first and second current transformers are each formed with a central bore, the line conductor and the neutral bus bar extending through the central bores of the at least first and second current transformers.

14. The circuit breaker as set forth in claim 11, in which the circuit includes a bimetal strip having a fixed end and a free end, the bimetal strip being structured to conduct current between the fixed and free ends, the bimetal member being free of connections with the sensing leads of the sensor apparatus.

15. The circuit breaker as set forth in claim 11, in which the circuit breaker includes a case having a separating wall, and in which the sensor includes a circuit board disposed adjacent a first side of the separating wall, the sensing leads extending between the circuit board and the one of the line conductor and the neutral conductor substantially without passing through a plane defined by the separating wall.

16. The circuit breaker as set forth in claim 15, in which the sensing leads are electrically connected with the line conductor.

17. The circuit breaker as set forth in claim 16, in which the line conductor is a line bus bar.

18. The circuit breaker as set forth in claim 17, in which the line bus bar is substantially rigid.

19. The circuit breaker as set forth in claim 16, in which the line conductor is a line shunt.

20. The circuit breaker as set forth in claim 19, in which the line shunt has a higher electrical resistance than that of copper.

* * * * *